March 10, 1931.  O. H. BANKER  1,795,465
TRANSMISSION MECHANISM
Filed Nov. 26, 1928   6 Sheets-Sheet 3

Inventor
Oscar H. Banker
by Quarles & French
Attorneys

March 10, 1931.  O. H. BANKER  1,795,465
TRANSMISSION MECHANISM
Filed Nov. 26, 1928   6 Sheets-Sheet 6

Inventor
Oscar H. Banker
By Charles J. French
Attorneys

Patented Mar. 10, 1931

1,795,465

UNITED STATES PATENT OFFICE

OSCAR H. BANKER, OF PHILADELPHIA, PENNSYLVANIA

TRANSMISSION MECHANISM

Application filed November 26, 1928. Serial No. 321,928.

The invention relates to transmission mechanism and more particularly to an automatically variable speed transmission mechanism.

In planetary change speed transmission mechanisms of the automatic or semi-automatic type, a brake band is usually associated with the planet gear carrier and acts to restrain its movement as the mechanism starts its action. Brake bands are objectionable from a maintenance standpoint and in my prior application, Serial No. 227,828, filed October 21, 1927, I have provided a friction clutch for resisting the initial turning movement of the planet carrier and associated said clutch with said carrier by the use of gearing connections. One of the objects of the present invention is to provide a novel friction clutch arrangement directly associated with the carrier which greatly simplifies the construction over that of my prior application above mentioned and reduces the number of parts.

The present invention is designed to provide a full automatic transmission, that is, one in which the change from one speed to another is effected automatically, dependent upon the speed of the driven shaft, which in an automotive vehicle is dependent upon the road speed of said vehicle. Where such transmission mechanisms are used for automotive vehicles it is desirable to control the automatic action thereof under certain driving conditions and to this end another object of the present invention is to provide mechanism for cutting out the low gear ratio so that the car may be run in second speed and automatically proceed into high speed to facilitate city driving or where good roads are available.

A further object of the invention is to provide a simple controlling mechanism for locking the transmission either in or out of low gear and in forward or reverse.

In some instances, as in going down hill, it is desirable to use the engine as a brake. In planetary type gear transmission mechanisms the action is such that when the high speed shaft drives through the planets and reduces the speed of the driven shaft, the planet carrier tends to revolve in a direction opposite to that of the drive shaft, which is resisted in this case by the friction clutch mechanism hereinafter described, but when the process is reversed and the driven shaft tries to drive the drive shaft the planet carrier makes an effort to turn in the same direction as the drive shaft and automatically renders the braking effect of the engine inoperative. According to the present invention, in order to prevent this action and permit the engine to act as a brake, I have provided a positive lock for the planet gear carrier.

The invention further consists in the several features hereinafter set forth and more particularly defined by claims at the conclusion hereof.

In the drawings

Fig. 3 is a detail sectional view taken generally on the line 3—3 of Fig. 1, parts being broken away and parts being shown in section;

Referring to the drawings, the numeral 16 designates the drive shaft, which in an automotive vehicle is the shaft operatively connected to the drive shaft of the engine through a suitable clutch (not shown) mounted in the housing 17, and 18 designates the driven shaft.

A casing 19 associated with the clutch housing 17 is provided with an anti-friction bearing 19' for the shaft 16 which is also journalled with certain of the transmission shafts in anti-friction bearings 20 and 21. The driven shaft 18 has a reduced end section mounted in roller bearings 22 at one end and is also journalled in an anti-friction bearing 23. A ball thrust bearing 24 is interposed between the shafts 16 and 18.

Figure 2:
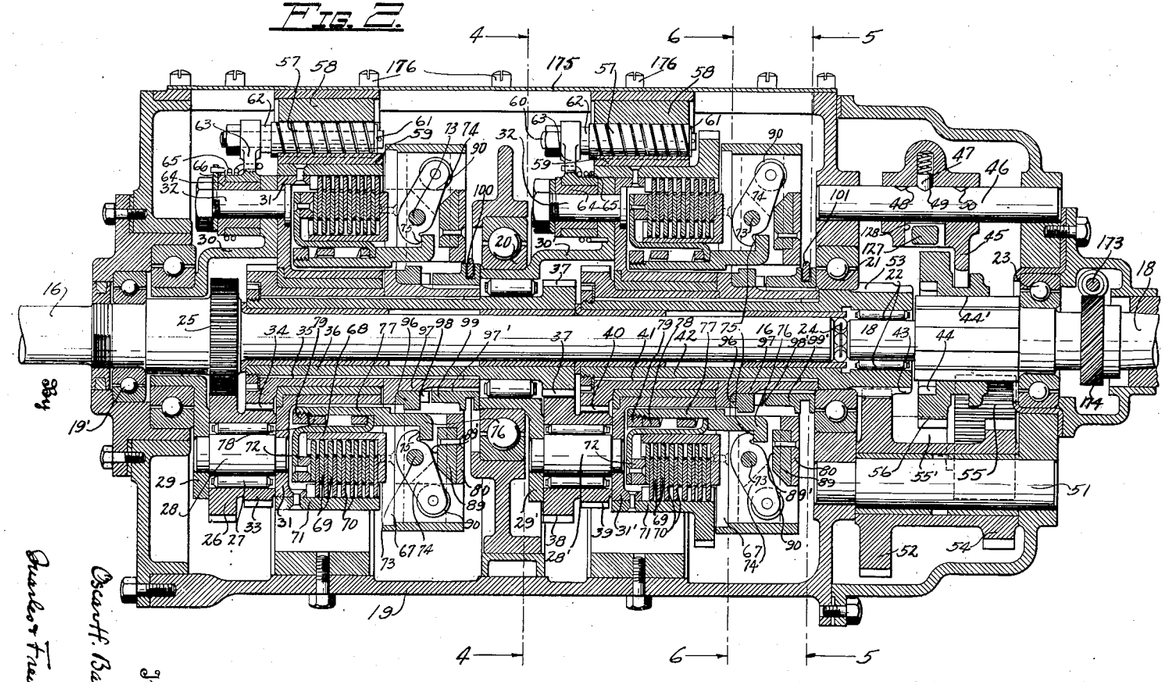
Fig. 2 is a vertical sectional view through the transmission, taken on the line 2—2 of Fig. 1.
Figure 4:
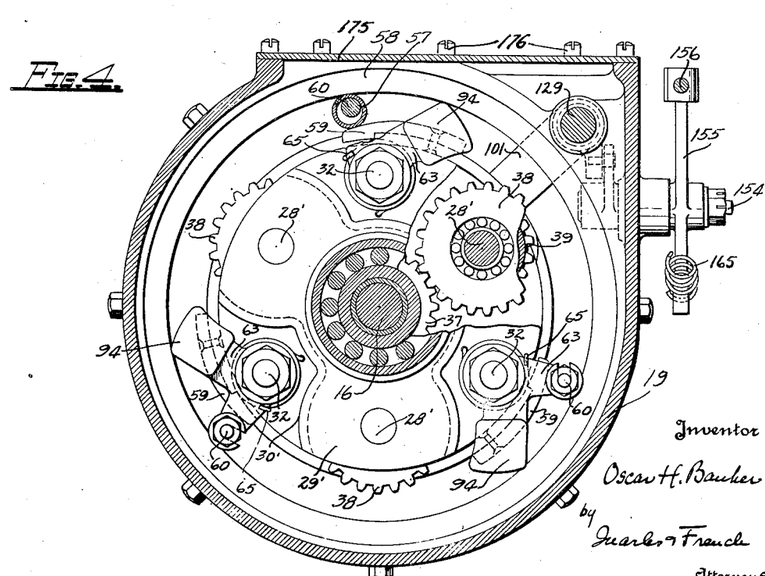
Fig. 4 is a detail sectional view taken on the line 4—4 of Fig. 2, parts being broken away and parts being shown in section.

The shaft 16 has a gear 25 formed integral therewith or connected thereto which meshes with gears 26, each provided with a suitable bearing, such as roller bearing 27 mounted on a stud shaft 28 mounted on the planet gear carrier 29 formed by spiders or flanged disks 30 and 31 which are fixedly secured together by bolts 32, see Figs. 2 and 4.

Each gear 26 is a compound gear having connected to it a gear 33 which meshes with a gear 34 which is splined by key 35 to a suitably bushed sleeve shaft 36 loosely mounted on the drive shaft 16. This gearing forms the first planetary change speed unit.

The sleeve 36 is provided at its rear end with a gear 37 which meshes with gears 38 of the second change speed unit and corresponding to the gears 26 so that the first control unit through the drive gear 34 effects the drive of this next unit which includes the gears 39 compounded with the gears 38 mounted on stud shafts 28' similar to the shafts 28 and similarly journalled and mounted in a planet carrier 29' formed of two parts 30' and 31' similar to the parts 30 and 31 and connected together by bolts 32, said gears 39 meshing with a gear 40 which is splined by key 41 to a suitably bushed sleeve shaft 42 loosely mounted on the drive shaft 16, thereby forming the second planetary change speed unit, which may be connected to the driven shaft 18 in any suitable manner, but preferably by forming the end of said sleeve 42 into a male clutch gear 43 engageable with a female clutch gear 44 whose hub is splined at 44' on the driven shaft 18.

This gear 44 is slidably mounted upon the shaft 18 and is moved longitudinally thereof by the usual forked clutch collar 45 which is slidably mounted on a support shaft 46 and is adapted to be releasably held by a spring-pressed pin 47 when associated with the recess 48, 49 and 50 in forward, neutral or reverse position, respectively. In position for forward drive the clutch gears 43 and 44 are engaged, while the neutral position is shown in Fig. 2. For the reverse a lay shaft 51 carries a gear 52 meshing with a gear 53, formed as a continuation of gear 43 and drivingly connected by another gear 54 to a broad-faced gear 55 mounted on a shaft 55' and which is engaged by a gear 56 formed as a part of the clutch gear 44 when said gear is moved to the right, as viewed in Fig. 2, to a position in which pin 47 engages in recess 50. The control of the clutch collar will be described later.

Figure 1:
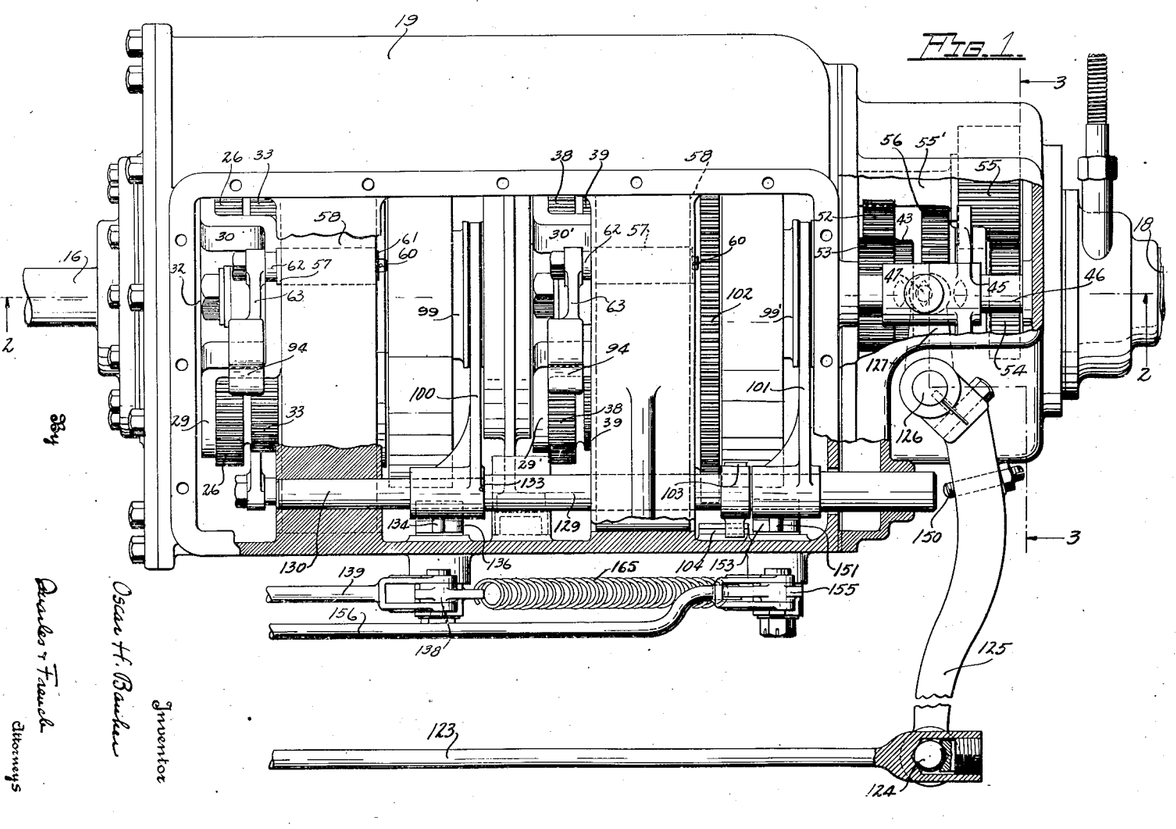
Fig. 1 is a plan view of transmission mechanism embodying the invention, parts being broken away and parts being shown in section.

In any planetary gearing the speed reduction is effected by holding the planet gear carrier against movement so that the reduction can be effected through the difference in gear ratios of the drive and driven gears. In such gearing also when the drive shaft starts to turn there is a constant tendency for the drive gear acting through the planet gears to turn the planet carrier in the opposite direction to that of the drive gear. This backward rotation tendency has heretofore been utilized in several instances to effect the automatic application of a band type brake to the carrier to prevent its rotation. Any form of band type brake introduces complications in a transmission which in the automatic type seriously interfere with continued satisfactory operation for extended periods of time because of the rapid wear of the brake bands and the ever present tendency of the band to drag on its drum in a release position. These disadvantages have been obviated in the present invention by providing, in connection with each change speed unit, a friction clutch mechanism embodying a roller 57 interposed between a relatively fixed part of the transmission, such as a ring 58 fixed to the casing 19 and a cam 59 on the planet carrier 29, the roller also being mounted to move with but have motion relative to said planet carrier. Referring to Figs. 1, 2 and 4, the rollers 57 are mounted between washers 61 and 62 on a shaft 60 bolted to an oscillatory lever arm 63 journalled on a bearing bushing 64 mounted on the bolt 32. A coiled tension spring 65 has one end connected to the arm 63 and its other end connected to an anchor plate 66 fixedly secured to the bolt 32. Each spring 65 normally urges its lever arm 63 outwardly to bring the roller 57 associated therewith into contact with the ring 58 and, as previously noted, the backward rotation tendency, that is, the rotation of the carrier 29 in a counter-clockwise direction, as viewed in Fig. 4, causes each cam 59 to wedge the roller 57 between it and the ring to initially hold the carrier against movement and allow the planetary gearing to effect the desired gear reduction. The rollers 57 are preferably in the form of Hyatt roller bearings, that is, they are of spirally wound spring steel stock so that they may assume an oval shape when put under pressure. Thus, in the present instance the holding of planet carriers of each set of planetary gearing produces low speed, the drive from first unit to second being effected through the shaft 36 and the gears associated therewith.

Each planetary gear set has clutch mechanism controlled by the speed of the vehicle for effecting the connection of the planet carrier with the driven gears so that said planet carrier revolves with said gears. A governor disk 67 is keyed to the shaft 36 by the key 35 or to the shaft 42 by the key 41 and is provided with a laterally extending ring 68 which is keyed to the driving disks 69, in the usual manner of forming disk clutches, which cooperate with the driven disks 70 that are similarly keyed to an annular ring portion 71 of each planet carrier. The stack of driving and driven disks is interposed between a pressure plate 72 and the back face of the governor disk 67. The governor disk 67 has a lever 74 fulcrumed to it at 73. The lever 74 has one end provided with a hook 75 engageable with the hooked end 76 of a tension-controlling member 77. The tension member 77 engages a square, helical spring 78 which is encased in the member 77 and the pressure plate 72 by means of a threaded connection 79 between parts of the member 77.

Figure 5:
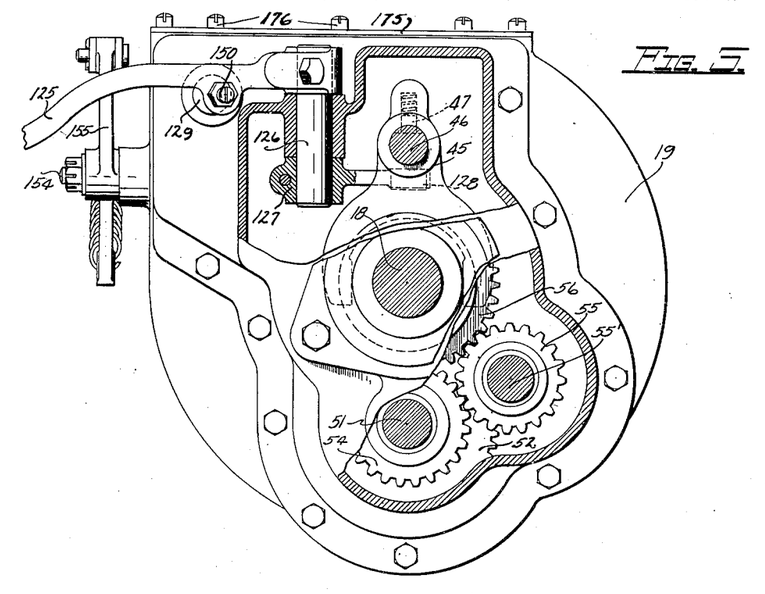
Fig. 5 is a detail sectional view taken on the line 5—5 of Fig. 2, parts being broken away and parts being shown in section.
Figure 6:
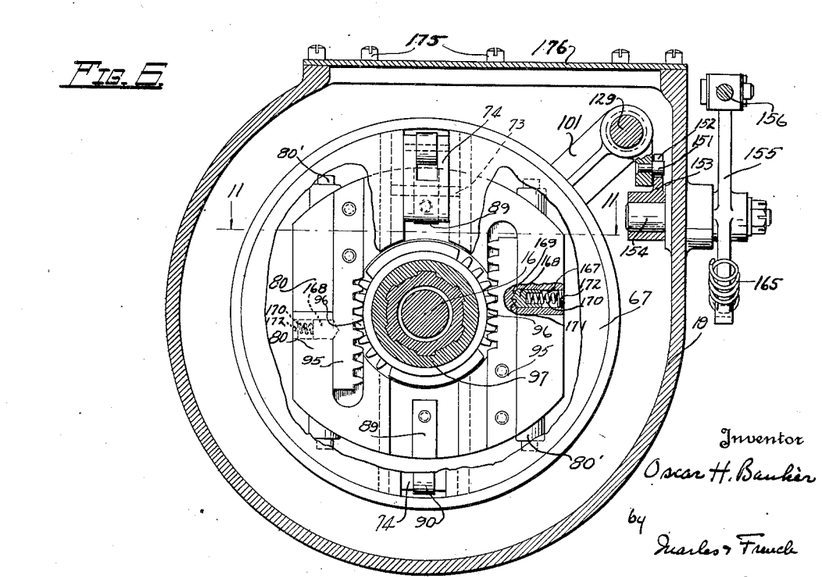
Fig. 6 is a detail sectional view taken on the line 6—6 of Fig. 2, parts being broken away.

Referring to Fig. 5, each governor disk has slidably mounted on its side a pair of governor weights 80 through which pass the floating studs 80' and the weights are recessed as at 81 to form pockets to receive springs 82 which surround said studs. The lower end of each stud is provided with a nut 83 in threaded engagement with it and provided with a pin 84 which is slidable in a keyway 85 on one of the governor weights. The nuts 83 are locked in their adjusted position by a lock washer 86 having a tongue 87 extending through a keyway in the stud 80' and bendable at its outer end into one of a series of slots 88 in the nut 83.

The governor weights 80 have blocks 89 secured thereto and preferably tapered at their outer ends, as shown in Fig. 2, which move into the path of rollers 90 mounted on the free end of the levers 74 whose pivot pin 73 is fulcrumed in the governor disk 67. The flat faces 89' of the blocks 89 provide a dwell for the movement of the levers 74 so as to control their maximum movement irrespective of the continued movement of the weights 79 beyond a point to effect said movement.

Figure 11:
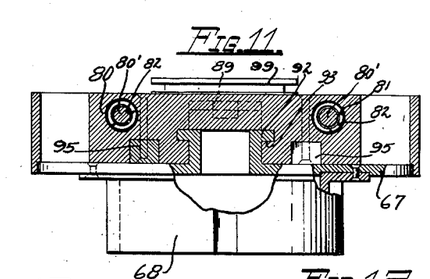
Fig. 11 is a detail sectional view through the governor assembly, parts being broken away.
Figure 12:
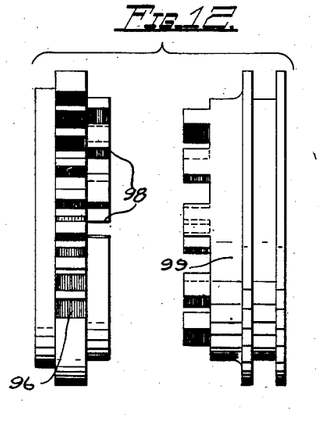
Fig. 12 is a composite view of the governor clutch members.
Figure 13:
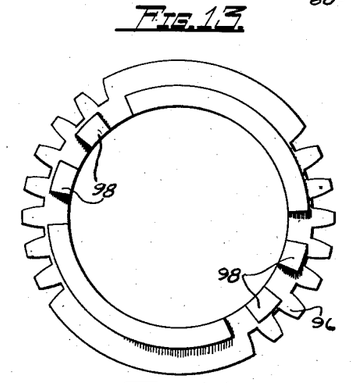
Fig. 13 is an elevation view of one of these clutch members.
Figure 14:
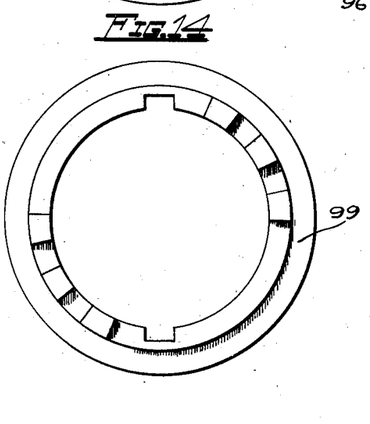
Fig. 14 is an elevation view of the other clutch member.
Figure 15:
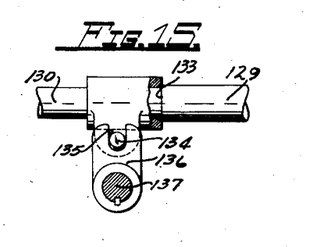
Fig. 15 is a detail view of parts of the governor clutch control, parts being shown in section.

The governor weights are guided in the transverse movement relative to the disk 67 by providing guides 92 on said disk cooperating with recesses 93 in the weights, as shown in Fig. 11.

With the foregoing construction it will be noted that when the speed of the driven shaft of each planetary gear set reaches a predetermined value the governor weights 79, under the action of centrifugal force, overcome the tension of the springs 82 and move outwardly and thus engage the levers 74 and swing them in a clockwise direction, as viewed in Fig. 2, thus causing said levers 74 to move the members 77 toward the right and put tension on the spring 78 which tension is thereby transmitted to the pressure plate 72, causing its movement to the right and thus putting pressure on the disk 69 and 70 and thereby establishing a driving connection between the driven shaft of the planetary gear set and its planetary gear carrier. The result is that the planet gear carrier then revolves in a clockwise direction, as viewed in Fig. 4, and the cams 59 thus move out of engagement with the rollers 57, so that the planet carrier then revolves freely. Under these conditions, in order to prevent wear of the rollers 57 by their continued travel upon the ring 58 under the action of the springs 65, the lever 63 for each roller, as shown in Fig. 4, is provided with a weighted arm portion 94 which then, under the action of centrifugal force, overcomes the tension of the springs 65 and swings the arms 63 inwardly, thus causing the rollers 57 to move away from the ring 58.

From the foregoing description it will be noted that when the engine clutch is thrown in the initial turning movement of the shaft 16 acts through the gears 25 and 36 and the planet carrier locking means, including the rollers 57, to hold the planet carriers 29 and 29' against movement and the vehicle is then in low gear, the gear 25 then driving through the planet gears 26 and 33 the gear 34, which through the shaft 36 and gear 37 drives the planet gears 38, 39, 40 and thus drives the driven shaft 42 which is in clutched connection with the shaft 18. As soon as the speed of the driven shaft 36 reaches a certain amount the governor weights associated therewith throw in the clutch for the first planetary unit, as above described, and the vehicle then proceeds in second speed, the gears 25, 26, 33, planet carrier 29, gear 34 and shaft 36 then revolving as a unit while the planet carrier 28' is still held stationary. When the speed of the vehicle is further increased to a point to cause the speed of the driven shaft 42 to operate the governor weights associated therewith to throw in the clutch of the second planetary unit, as above described, the vehicle is in high gear or direct drive, since both sets of planetary gears are revolving with the drive shaft. Thus, the change in speed is effected automatically and is dependent upon the speed of the vehicle. The speed of the vehicle is controlled by accelerating or decelerating the engine speed through the usual throttle control and the use of the brakes.

In certain instances it is desirable to lock the vehicle in low gear and in many instances it is very desirable to lock out the low gear, as in city driving, so that the vehicle may proceed directly from second into high gear. These conditions are brought about in the present instance by providing a clutch for the governor under the control of the operator of the vehicle and adapted to lock the governors in either a closed or expanded condition. Referring to Figs. 2, 6, and 11 to 14, inclusive, it will be noted that each governor weight has affixed to it a rack 95 which meshes with a pinion 96 which is loosely mounted on the hub 97 of the governor disk 67.

The pinion 96 has clutch members 98 on one face which cooperate with the teeth of a clutch member 99 slidably keyed on the splined portion 97' of the hub 97 of the governor disk 76. A manually controlled clutch shifter 100 engages in an annular groove in the member 99 and serves to move it into or out of engagement with the cooperative clutch member 98. If this movement is effected at the time when the shaft 36 is at rest the clutch member 98, through the rack and pinion connections above described, is in a position for such engagement and the vehicle is then locked in low gear. If an attempt is made to shift the clutch member before the governor weights have moved to a fully expanded position the rack and pinion connections prevent engagement of the clutch members. However, as soon as the vehicle is in second or high gear the governor weights of the first planetary set are then in expanded position and the rack and pinion connections have moved the member 98 to a registering position with the member 99 so that the operator may then shift said member 99 to operative position and the first speed gear set will be locked out.

Similar mechanism is provided for locking the governor of the second planetary unit in second speed and the clutch members 99' and 98', similar to the clutch members 99 and 98, are shown in Fig. 2, the member 99' being controlled by a manually controlled shifting lever 101.

It has also been pointed out that it is desirable to positively prevent the rotation of the planet gear carrier 29' so that the engine may be used as a brake and for this purpose this carrier has a gear portion 102 formed thereon, adapted to be engaged by a segmental lock gear 103 slidably mounted on guides 104 on the casing 18, but fixed against rotation relative thereto.

The preferred arrangement for operating the manual controls is shown in Figs. 7 to 10, inclusive. Mounted on the steering column 105 are fittings 106 and 107 connected to a tubular casing 108 and a shaft 109 is journalled in said fittings and extends through said casing 108. The upper end of shaft 109 carries a nut 110 bearing on a hub of a gear shift handle 111. This handle is yieldingly held against movement by frictional engagement therewith of a tubular member 112 urged into frictional engagement with said lever by a spring 113 mounted in a recess in the fitting 106 and bearing against said member 112. This member 112 is prevented from rotating by keyed connection with the fitting 106 formed by a slot 114 in said member registering with a pin 115 secured to said fitting. Member 112 has a quadrant or sector plate portion 116 having the letters R, N, and F, indices for "Reverse", "Neutral" and "Forward", respectively, and stop pins 117 to limit the swing of the handle 111. The lower end of the shaft 109 carries a bevel gear 118 meshing with a bevel gear 119 on a transverse shaft 120 journalled in the fitting 107, said shaft carrying a lever 121 connected by a ball and socket joint 122 to a link 123 connected by another ball and similar socket joint 124, shown in section in Fig. 1, to a lever 125 mounted on a shaft 126 journalled in the transmission casing, see Fig. 3. The shaft 126 carries a lever arm 127 whose free end works in a recess 128 in the clutch shifter 45, see Fig. 2, whereby movement of said handle to the "R" position will, through the connnections above described, move the clutch shifter 45 from neutral position toward the right, as viewed in Fig. 2, to bring the gear 56 into mesh with the gear 55 to effect the reverse and movement of said handle to the "F" position will, through the connections above described, move said shifter 45 toward the left to bring the clutch 44 into engagement with the cooperative clutch gear 43 to produce the forward drive.

The shifter 100 is mounted to move independently on and with its supporting rod 129, said shifter being slidably mounted on a reduced end portion 130 of said rod to move relative thereto and being engaged by a shoulder 133 of said rod to move therewith. Independent movement of the shifter 100 is effected by a pin 134 secured thereto working in a slot 135 in a lever 136 secured to a shaft 137 journalled in the casing 19 and carrying a lever 138 connected by a link 139 to one end of a lever 140 pivotally mounted at 141 upon the dashboard 142 of the vehicle. The lever 140 is operatively connected intermediate its ends by a link 143 to the intermediate portion of a lever 144 which is pivotally mounted at 145 upon said dash and has its free end connected by a link 146 to a push-and-pull plunger 147 slidably mounted in a support 148, here shown as the instrument board, and provided with an operating button 149. Pulling this plunger outwardly will, through the levers and links above described, swing the lever 136 toward the right, as viewed in Fig. 7, to move the clutch member 99 to release position, while an inward movement of said plunger moves the parts in the opposite direction to bring the clutch member 99 into engagement with the member 98 to lock the first change speed gear set either into or out of low gear.

The shifter 101 is mounted to move with the rod 129 either under the action of its own control or through the movement of said rod 129 by the lever's 125 movement to reverse position. This last movement is effected by mounting the rod 129 in the path of movement of the lever 125, which has an adjustable thrust-screw 150 engageable with the end of said rod as said lever is moved to reverse position, thus causing the movement of both shifters 100 and 101 to move their governor clutches into register to lock the governors in contracted position and as a consequence the reverse motion of the shaft 18 is maintained constantly at a low speed to check against any accidental or quick backing, which is further checked by the engagement of stop gear 103 with the gear 102, said gear 103 being secured to said rod 129. The shifting into the reverse is done when the shaft 18 is at a standstill.

The direct movement of the rod 129 is effected by providing a pin 151 on the shifter 101 engaging in a slot 152 in a lever 153 mounted on a shaft 154 journalled in the casing and carrying a lever 155 which is connected by a link 156 to one end of a lever 157 pivotally mounted at 158 upon the dash 142. The lever 157 is operatively connected by a link 159 to the intermediate portion of a lever 160 which is pivotally mounted at 161 upon said dash and has its free end connected by a link 162 to a plunger 163 slidably mounted in the support 148 and provided with an operating button 164. Pulling this plunger outwardly will, through the levers and links above described, swing the lever 153 toward the right, as viewed in Fig. 7, to move the clutch member 99' to release position, while an inward movement of said plunger moves the shaft 129 in the opposite direction to throw in both governor clutches and the vehicle is then locked in low gear, at which time also the gear 103 is in mesh with the gear 102 and the planetary carrier of the second speed gear set is positively locked against rotation.

Figures 7, 8, 9, 10:
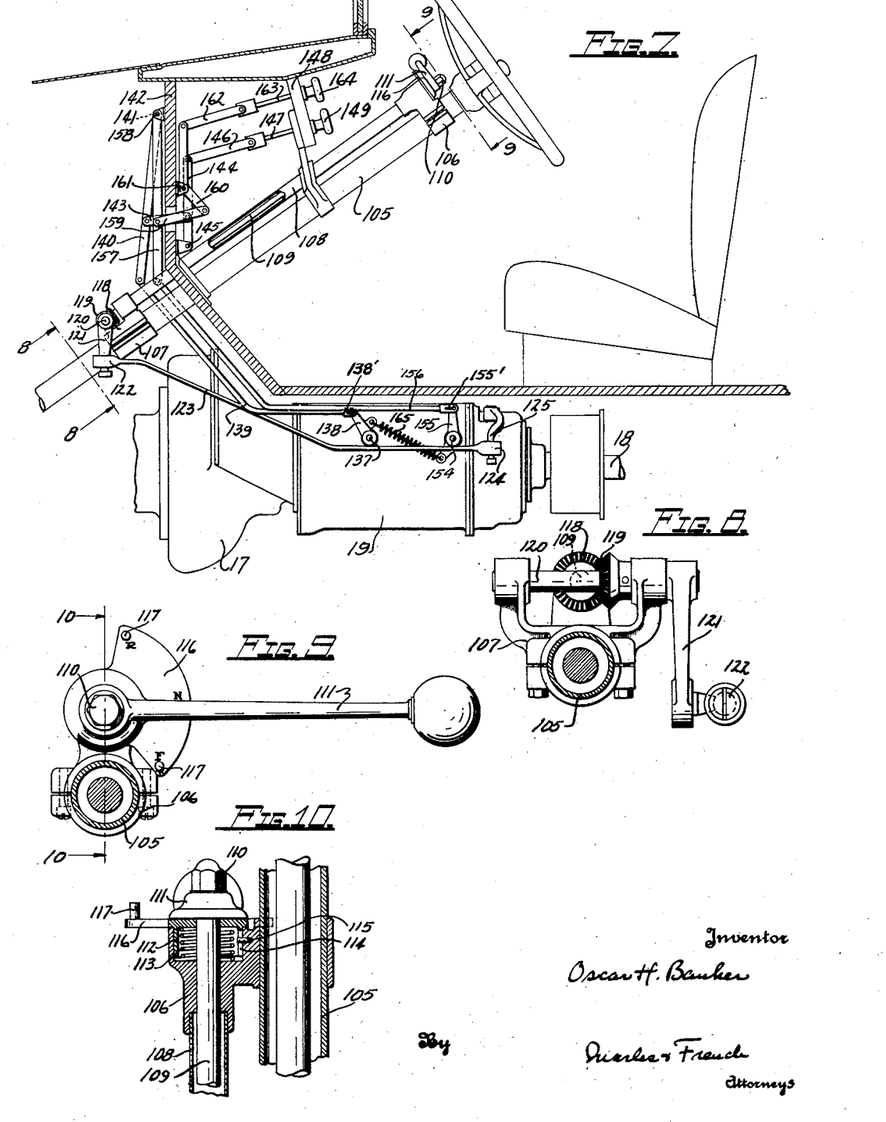
Fig. 7 is a side elevational view of the transmission mechanism embodying the invention.
Fig. 8 is a detail sectional view taken on the line 8—8 of Fig. 7.
Fig. 9 is a detail sectional view taken on the line 9—9 of Fig. 7.
Fig. 10 is a detail sectional view taken on the line 10—10 of Fig. 9.

Referring to Fig. 7, a spring 165 connects the levers 138 and 155 together on opposite sides of the pivotal mountings of said levers, whereby the rod 129, when moved by the lever 125, is returned to release position by the action of said spring upon said levers, the levers 136 and 153, pins 134 and 151 and shifters 100 and 101. The independent movement of these parts is permitted by the slots or lost motion connections 138' and 155', respectively, between the lever 138 and link 139 and lever 155 and link 156.

In connection with the governor structure, it is highly desirable to have the governor weights act to shift the clutch only at the time the desired speed has been reached and thus prevent any action of the governor upon the clutch disks until this speed has been reached. To accomplish this purpose I employ in each instance the arrangement shown in Fig. 6, wherein each governor weight 80 is provided with a bore 167 in which a detent or pin 168 is slidably mounted and has a conically pointed end 169 urged by a spring 170 into engagement with a notch 171 in the rack 95 carried by the other weight, said spring being held in position by a plug 172 screwed into the threaded end of the bore 167. With this construction, until the inertia forces imparted to the weights 80, tending to move them apart, are sufficient to overcome the pressure of the springs 170 acting on the pins 168, said pins will not be released, but are released in a definite and positive manner at the time the desired speed has been reached so that the action of the weights will promptly move the clutch disks associated therewith into operative engagement.

It is also to be noted that in the arrangement of the rollers 57, ring 58 and cams 59, I have provided means whereby the vehicle is held from rolling backwards when stopping on an incline. This action takes place due to the fact that when the driven shaft under such conditions acts as a driver it turns the planet gears backwards and this acts to turn the planet gear carriers 29 or 29' backwards, thereby moving the cams 59 in a direction to wedge the rollers 57 between said cams and the ring 58 and thus prevent this rotation and consequently hold the vehicle against a backward rolling movement when stopping on an incline.

Thus it will be noted that the controls herein provided selectively lock the transmission either in low gear or in second and that the transmission is also locked in low gear during reverse.

As shown in Figs. 1 and 2, the drive for the speedometer is secured by connecting the flexible shaft with a worm 173 meshing with a worm-wheel 174 on the shaft 18.

The casing 19 has a removable top cover plate 175 secured in position by screws 176.

In accordance with the provisions of the patent statutes, I have described the principle of operation of my invention together with the apparatus, which I now consider represents the best embodiment thereof; but I desire it to be understood that the apparatus shown is only illustrative and that the invention can be carried out by other means within the scope of my claims.

What I claim as my invention is:

1. In an automatically variable change speed transmission, the combination of a drive shaft, a driven shaft, a plurality of sets of planetary gear units between said shafts, a disk clutch for connecting the planetary gear carrier of each unit to its driven gear, a speed-responsive governor controlling each clutch, and manually-controlled means for locking the governor of the first unit in expanded position.

2. In an automatically variable change speed transmission, the combination of a drive shaft, a driven shaft, a plurality of sets of planetary gear units between said shafts, a clutch for connecting the planetary gear carrier of each unit to its driven gear, a speed-responsive device controlling each clutch, and manually-controlled means associated with the speed-responsive device of the first planetary unit for locking it either in inoperative or operative position.

3. In an automatically variable change speed transmission, the combination of a drive shaft, a driven shaft, planetary gear units between said shafts, a clutch for connecting the planetary gear carrier of each unit to its driven gear, a speed-responsive device controlling each clutch, control means for each speed-responsive device including a manually-controlled locking clutch whereby to lock said transmission in low or second speed, one of said locking clutches being operable to lock the speed-responsive device of the first planetary unit in its high speed position.

4. In an automatically variable change speed transmission, the combination of a drive shaft, a driven shaft, a pair of planetary gear units between said shafts, governor-operated means controlling the planetary gear carriers of said units dependent upon the speed of the driven shaft, and means to positively lock the gear carrier of the second gear unit.

5. In an automatically variable change speed transmission for motor vehicles, the combination with the dash portion and the steering column of said vehicle, of an automatically variable change speed transmission mechanism including low and intermediate governor-operated gear sets, manually-operated means mounted on said dash portion and associated with the governors of said gear sets to control the same, forward and reverse gearing, and manually-controlled means mounted on said steering column and operatively connected to said forward and reverse gearing to control the same.

6. In an automatically variable change speed transmission mechanism, the combination of a drive shaft, a driven shaft, a pair of planetary gear units between said shafts, a disk clutch for connecting the planetary gear carrier of each unit to its driven gear, a speed-responsive governor controlling each clutch, manually-controlled means for controlling said governors, and manually-controlled means for positively preventing the rotation of the planetary gear carrier of the second gear unit.

7. In an automatically variable change speed transmission for automotive vehicles, the combination with the dash of said vehicle, of governor-operated change speed gear sets, and manually-operable governor controls mounted on the dash portion of said vehicle.

8. In an automatic transmission, the combination with a drive member, a driven member and a planetary gearing between said members including a planetary gear carrier having wedge surfaces, of a friction brake including a fixed support and a wedge member cooperating with said support and with said surfaces and movable with and relative to said carrier to arrest its rotation on its initial tendency to turn backward and to move with said carrier on its forward rotation, and speed-responsive means for releasing said wedge member from contact with said support on the forward rotation of the carrier.

In testimony whereof, I affix my signature.

OSCAR H. BANKER.